US009845424B2

(12) United States Patent
Del Gaudio et al.

(10) Patent No.: US 9,845,424 B2
(45) Date of Patent: Dec. 19, 2017

(54) PROCESS FOR THE REMOVAL OF DEPOSITS FROM AN OIL OR GAS WELL, AND/OR FROM THE SURFACE STRUCTURES, AND/OR FROM THE EQUIPMENT CONNECTED THEREWITH, AND/OR FROM HYDROCARBON BEARING FORMATIONS

(75) Inventors: Lucilla Del Gaudio, San Donato Milanese (IT); Giuseppe Leo, Ravenna (IT); Alessandra Belloni, Cerro Al Lambro (IT); Paola Albonico, Milan (IT)

(73) Assignee: ENI S.p.A., Rome (IT)

( * ) Notice: Subject to any disclaimer, the term of this patent is extended or adjusted under 35 U.S.C. 154(b) by 765 days.

(21) Appl. No.: 13/642,938

(22) PCT Filed: Apr. 14, 2011

(86) PCT No.: PCT/IB2011/000850
§ 371 (c)(1),
(2), (4) Date: Dec. 6, 2012

(87) PCT Pub. No.: WO2011/132052
PCT Pub. Date: Oct. 27, 2011

(65) Prior Publication Data
US 2013/0079255 A1    Mar. 28, 2013

(30) Foreign Application Priority Data
Apr. 23, 2010   (IT) .............................. MI2010A0695

(51) Int. Cl.
*C09K 8/524*    (2006.01)

(52) U.S. Cl.
CPC .................................... *C09K 8/524* (2013.01)

(58) Field of Classification Search
None
See application file for complete search history.

(56) References Cited

U.S. PATENT DOCUMENTS 3,630,953 A * 12/1971 Simon et al. ....... B01F 17/0092
                                                              137/13
2006/0096757 A1    5/2006 Berry et al.
(Continued)

FOREIGN PATENT DOCUMENTS

| WO | 2007 112967 | 10/2007 |
| WO | 2009 006251 | 1/2009 |
| WO | 2010 065516 | 6/2010 |

OTHER PUBLICATIONS

International Search Report dated Aug. 16, 2011 in PCT/IB11/00850 Filed Apr. 14, 2011.

*Primary Examiner* — Jeffrey Washville
(74) *Attorney, Agent, or Firm* — Oblon, McClelland, Maier & Neustadt, L.L.P.

(57) ABSTRACT

Process for the removal of deposits from an oil or gas well, and/or from surface structures, and/or from the equipment connected therewith, and/or from hydrocarbon-bearing formations, comprising:—injecting at least one oil-in-water nanoemulsion into said oil or gas well, and/or surface structures, and/or equipment connected therewith, and/or hydrocarbon bearing formations; leaving said nanoemulsion in said oil or gas well, and/or surface structures, and/or equipment connected therewith, and/or hydrocarbon bearing formations, for a predetermined time.

21 Claims, 3 Drawing Sheets

(56) References Cited

U.S. PATENT DOCUMENTS

2007/0265171 A1* 11/2007 Javora et al. .................. 507/90
2009/0118380 A1* 5/2009 Del Gaudio et al. ......... 514/772
2010/0137168 A1 6/2010 Quintero et al.

* cited by examiner

SAMPLES A

SAMPLES B

SAMPLES A

SAMPLES B

PROCESS FOR THE REMOVAL OF DEPOSITS FROM AN OIL OR GAS WELL, AND/OR FROM THE SURFACE STRUCTURES, AND/OR FROM THE EQUIPMENT CONNECTED THEREWITH, AND/OR FROM HYDROCARBON BEARING FORMATIONS

The present invention relates to a process for the removal of deposits from an oil or gas well, and/or from surface structures, and/or from the equipment connected therewith, and/or from hydrocarbon bearing formations.

More specifically, the present invention relates to a process for the removal of deposits, in particular organic deposits, from an oil or gas well, and/or from surface structures, and/or from the equipment connected therewith, and/or from hydrocarbon bearing formations, by the use of an oil-in-water nanoemulsion.

It is known that the recovery of oil and/or gas from hydrocarbon bearing formations is normally effected by means of oil or gas wells. It is also known that during the exploitation of oil or gas wells, damage can occur due to the formation of deposits such as, for example: clogging emulsions (e.g., emulsions which can be formed between the aqueous phases and the oily phases present in said hydrocarbon bearing formations and which can be stabilized by the presence of compounds capable of interacting at the water/oil interface, such as, for example, asphaltenes, paraffins or fine particulate); sludges; oily deposits; paraffins; asphaltenes; mixtures of sludges, oily deposits, paraffins, asphaltenes. Said deposits can block the pores of said hydrocarbon-bearing formations and also the oil or gas wells, and/or the surface structures, and/or the equipment connected therewith. There is consequently a decrease in the productivity of said oil or gas wells and, in extreme cases, a total production loss of said wells.

Various processes are known for removing these deposits.

The removal of said deposits can be effected, for example, through a process comprising the use of mixtures of aromatic and/or aliphatic hydrocarbon solvents, optionally halogenated. Said mixtures of solvents can optionally comprise surfactants in order to favour their mixing with water and to be capable of also operating on deposits with wet surfaces or immersed in water. The presence of water and surfactants, however, generally significantly decreases the removal capacity of said solvent mixtures.

A further process comprises the use of bacteria capable of digesting deposits, in particular organic deposits, such as, for example, paraffins, asphaltenes. The removal capacity of this process, however, is normally linked to the temperature of the wells and is sensitive to various environmental factors such as, for example, the composition of the oil. In addition, this process is typically slower than the above process comprising the use of mixtures of solvents.

Another process comprises the use of water-based alkaline cleaners. Said cleaners generally include alkaline builders, water-soluble solvents, surfactants. Said alkaline builders can be selected, for example, from: hydroxides, carbonates, phosphates, silicates. Said water-soluble solvents can be selected, for example, from: ethers of ethylene glycol, ethers of diethylene glycol, ethers of propylene glycol, ethers of dipropylene glycol. Said surfactants can be selected, for example, from: ethoxylated alkyl phenols, ethoxylated linear alcohols, alkyl sulfonates, amphoteric surfactants, fatty acid alkanolamides. The removal capacity of said cleaners is normally lower than that of the mixtures of solvents.

A further process comprises the use of hot oil which is injected into the wells. Hot oil is capable of dissolving deposits, in particular organic deposits, such as, for example, paraffins, asphaltenes, and bringing them to the surface of the wells. Said process however is normally inefficient, and the use of said hot oil can also create dangerous conditions for both the environment and for the health of the operators, and it can negatively influence the production capacity of the wells.

The most widely-used process among those described above, is generally that comprising the use of mixtures of aromatic and/or aliphatic hydrocarbon solvents, optionally halogenated. Said solvents, however, in addition to having a high cost, can cause very serious drawbacks due to both their high volatility and their high flammability (i.e. low flash point). Halogenated solvents, moreover, can cause problems relating to the health of the operators and also to the environment, as they contribute to the depletion of ozone in the atmosphere: these solvents are in fact normally known as "Ozone Depleting Substances (ODS). Furthermore, the disposal of said spent solvents, which must be effected according to the regulations of the various governments, is generally costly.

Efforts have been made in the art to overcome the above drawbacks.

U.S. Pat. No. 5,977,032, for example, describes a process for the removal of deposits comprising heavy hydrocarbon materials and inorganic materials in the form of fine particles (said inorganic materials typically comprise "proppants" used in hydraulic grinding treatment, sands and/or fine particles present in the reservoirs, precipitated materials such as iron sulfates, carbonates, and the like) from a well, said process comprising:

injecting an aqueous composition of surfactants comprising an aqueous solution containing: (1) an acid material consisting of about 0.1% by weight to about 30% by weight of an organic acid selected from the group consisting of acetic acid, formic acid, propionic acid and citric acid, or about 0.5% by weight to about 15% by weight of hypochloric acid; (2) about 0.25% by weight to about 10% by weight of an alkyl polyglucoside surfactant selected from alkyl polyglucosides containing alkyl groups having from about 9 to about 16 carbon atoms, and mixtures thereof; (3) about 0.25% by weight to about 10% by weight of an ethoxylated alcohol selected from the group consisting of ethoxylated alkyl alcohols containing from about 6 to about 16 carbon atoms in the alkyl alcohol and from about 2.5 to about 6 ethylene-oxide groups, and mixtures thereof; and (4) about 0.1% by weight to about 6% by weight of at least one alkyl alcohol having from about 4 to about 8 carbon atoms;

maintaining the aqueous composition of surfactants in the well for a predetermined time; and injecting an aqueous solution (e.g., water, brine) into the well.

The above process is said to be capable of removing heavy hydrocarbon materials and inorganic materials in the form of fine particles from wells, more effectively with respect to the use of mixtures of organic solvents.

U.S. Pat. No. 5,996,692 describes a process for the removal of deposits comprising heavy hydrocarbon materials and inorganic materials in the form of fine particles (said inorganic materials typically comprise: "proppants" used in hydraulic grinding treatment, sands and/or fine materials present in the reservoirs, precipitated materials such as iron sulfates, carbonates, and the like) from pipes present in a water injection well or in an alternating water and gas injection well, said process comprising:

injecting an aqueous composition of surfactants comprising an aqueous solution containing: (1) about 0.1% by weight to about 10% by weight of an alkyl polyglucoside surfactant selected from alkyl polyglucosides containing alkyl groups having from about 8 to about 19 carbon atoms, and mixtures thereof; (2) about 0.1% by weight to about 10% by weight of an ethoxylated alcohol selected from the group of ethoxylated alkyl alcohols containing from about 6 to about 16 carbon atoms in the alkyl alcohol, and from about 2.5 to about 6 ethylene oxide groups, and mixtures thereof, and ethoxylated alkyl phenols containing from about 8 to about 14 carbon atoms in the alkyl group and from about 2 to about 8 ethylene oxide groups, and mixtures thereof; and mixtures of ethoxylated alkyl alcohols and ethoxylated alkyl phenols; (3) about 0.5% by weight to about 10% by weight of a caustic substance selected from the group consisting of sodium hydroxyde, potassium hydroxide, ammonium hydroxide, and mixtures thereof; and (4) about 0.1% by weight to about 6% by weight of at least one alkyl alcohol having from about 4 to about 6 carbon atoms, into the pipelines in amounts sufficient for substantially filling the pipelines;

maintaining the aqueous composition of surfactants for a predetermined period of time; and injecting an aqueous solution (e.g., water, brine) into the pipelines.

The above process is said to be capable of removing heavy hydrocarbon materials and inorganic materials in the form of fine particles from pipelines present in water injection wells, or in alternating water and gas injection wells, avoiding the necessity of using the techniques known by the name of "pigging or coiled tubing operations", which generally, in addition to being expensive, require lengthy execution times.

Also the above processes, however, can have various drawbacks. The use of acids (e.g., hydrochloric acid), or of caustic substances (e.g., sodium hydroxide), for example, can cause problems for both the health of the operators and also for the environment. In addition, the use of acids can cause corrosion of the metallic parts which enter into contact with the aqueous solutions containing said acids. Metallic parts sensitive to corrosion are, for example, well casings, well heads, pipelines, separators, tanks.

Processes capable of overcoming these drawbacks are known in the art,

U.S. Pat. No. 6,173,776, for example, describes a process for removing and preventing the formation of paraffins, tars, heavy oils, calcium carbonate, iron hydroxide, and other soils and scales, from oil or gas wells, or from hydrocarbon reservoirs, or from recovery, pumping, or transmission equipment, which comprises introducing into said wells, reservoirs, or equipment, a composition comprising from about 40% by weight to about 99% by weight of a mixture of alkyl esters of fatty acids; and from about 1% by weight to about 25% by weight of a short-chain alkyl glycol ether; the remaining percentage consisting of suitable additives.

The above process is said to be capable of improving the flow of gas and/or oil and of reducing the adhesion of soils and the formation of scales from oil or gas wells, from hydrocarbon reservoirs, or from recovery, pumping, or transmission equipment.

U.S. Pat. No. 6,672,388 describes a process for cleaning the walls, pipelines, or casings of a wellbore using a turbulent flow regime, characterized by:

a) preparing an aqueous composition of surfactants comprising from about 10% by weight to about 60% by weight of a surfactant mixture, said mixture comprising from 10% by weight to 50% by weight of an anionic derivative of an alkyl polyglucoside, from 35% by weight to 80% by weight of an alkyl polyglucoside, and from 5% by weight to 25% by weight of an anionic derivative of a fatty alcohol, the total balance being 100%;

b) diluting the aqueous composition of surfactants in water so as to form a diluted aqueous composition of surfactants and injecting the diluted aqueous composition of surfactants inside a wellbore containing drilling muds, oily residues, and other undesired deposits;

c) extracting the aqueous solution of surfactants containing drilling mud, oily residues, and other undesired deposits, from the wellbore; and d) removing the drilling mud, oily residues, and other undesired deposits, from the aqueous solution of surfactants.

The above process is said to have a good cleaning capacity combined with improved toxicological and environmental properties.

U.S. Pat. No. 7,380,606 describes a process for the treatment of an oil or gas well which comprising: preparing a solvent-surfactant mixture by combining a solvent and a surfactant, wherein the surfactant has a hydrophilic-lipophilic balance (or HLB) ranging from 8 to 18 and wherein the surfactant is an oil-in-water mixture which includes an ethoxylated castor oil; preparing a microemulsion by combining the solvent-surfactant mixture with a water-based fluid as carrier (e.g., water, brine); and injecting the microemulsion into the oil or gas well.

The above process is said to be capable of removing undesired deposits (e.g., scales, paraffins, fine particles, tars, heavy oils, etc.) from the oil or gas wells and of improving their production capacity.

Although the processes described above are said to obtain further improvements, in particular with respect to processes using mixtures of solvents, there is a continuous need for effective processes capable of maintaining or of improving the removal capacity of deposits from oil or gas wells, and/or from surface structures, and/or from the equipment connected therewith, and/or from hydrocarbon bearing formations.

The Applicant therefore considered the problem of finding a process which allows a better removal of deposits, in particular of organic deposits, from oil or gas wells, and/or from surface structures, and/or from the equipment connected therewith, and/or from hydrocarbon bearing formations.

The Applicant has now found that the removal of deposits, in particular of organic deposits, from oil or gas wells, and/or from surface structures, and/or from the equipment connected therewith, and/or from hydrocarbon bearing formations, can be advantageously effected by using an oil-in-water nanoemulsion.

In fact, the use of said oil-in-water nanoemulsion having the dispersed phase (i.e. oil) distributed in the dispersing phase (i.e. water and surfactants) in the form of droplets having a large specific area (area/volume) (i.e. a specific area higher than or equal to 6,000 $m^2$/lt.) allows a better recovery of said deposits to be obtained, even in the presence of a low amount of solvent (i.e. an amount of solvent lower than or equal to 20% by weight with respect to the total weight of said nanoemulsion).

Furthermore, the use of said oil-in-water nanoemulsion comprising a low amount of solvent, allows the removal of deposits situated at great depth (e.g., deposits found in hydrocarbon bearing formations located at great depth), or in long distance pipelines, which would otherwise require excessively high volumes of solvent.

In addition, the use of said oil-in-water nanoemulsions allows the removal of deposits covered by water on the surface or immersed in water.

Said oil-in-water nanoemulsions, moreover, thanks to the low amount of solvent contained therein, have "green solvent" characteristics, and consequently a low environmental impact.

An object of the present invention therefore relates to a process for the removal of deposits from an oil or gas well, and/or from surface structures, and/or from the equipment connected therewith, and/or from hydrocarbon bearing formations, comprising:

injecting at least one oil-in-water nanoemulsion into said oil or gas well, and/or surface structures, and/or equipment connected therewith, and/or hydrocarbon bearing formations;

leaving said nanoemulsion in said oil or gas well, and/or surface structures, and/or equipment connected therewith, and/or hydrocarbon bearing formations, for a predetermined time.

In accordance with a preferred embodiment of the present invention, said deposits can be organic deposits.

For the purposes of the present description and of the following claims, the term "organic deposits" refers to clogging emulsions (e.g., emulsions which can be formed between the aqueous phases and the oily phases present in the hydrocarbon bearing formations, and which can be stabilized by the presence of compounds capable of interacting at the water/oil interface, such as, for example, asphaltenes, paraffins or fine particulate); sludges; oily deposits; paraffins; asphaltenes; mixtures of sludges, encrustations, paraffins, asphaltenes.

For the purposes of the present description and of the following claims, the term "surface structure" refers to: well heads, pipelines, tanks.

For the purposes of the present description and of the following claims, the term "equipment" refers to: separators, drilling tools.

For the purposes of the present description and of the following claims, the definitions of the numerical ranges always comprise the extremes, unless otherwise specified.

In accordance with a preferred embodiment of the present invention, said oil-in-water nanoemulsion can comprise a dispersed phase (i.e. oil) and a dispersing phase (i.e. water and surfactants).

In accordance with a preferred embodiment of the present invention, in said oil-in-water nanoemulsion, the dispersed phase (i.e. oil) can be distributed in the dispersing phase (i.e. water and surfactants) in the form of droplets having a diameter ranging from 10 nm to 500 nm, preferably ranging from 15 nm to 200 nm.

Oil-in-water nanoemulsions particularly useful for the purposes of the above process can be prepared as described, for example, in international patent application WO 2007/112967 whose content is incorporated herein as reference. Said process allows monodispersed oil-in-water nanoemulsions to be obtained, having a high stability and having the dispersed phase (i.e. oil) distributed in the dispersing phase (i.e. water and surfactants) in the form of droplets having a large specific area (area/volume) (i.e. a specific area higher than or equal to 6,000 $m^2/lt.$).

In accordance with a preferred embodiment of the present invention, said oil-in-water nanoemulsion can be prepared according to a process comprising:

the preparation of a homogeneous water/oil mixture (1) characterized by an interface tension lower than or equal to 1 mN/m, preferably ranging from $10^{-2}$ mN/m to $10^{-4}$ mN/m, comprising water in an amount ranging from 65% by weight to 99.9% by weight, preferably ranging from 70% by weight to 99% by weight, with respect to the total weight of said mixture (1), at least two surfactants having a different HLB, selected from non-ionic, anionic, polymeric surfactants, preferably non-ionic, said surfactants being present in such an amount as to make said mixture (1) homogeneous;

the dilution of said mixture (1) in a dispersing phase consisting of water to which at least one surfactant has been added, selected from non-ionic, anionic, polymeric surfactants, preferably non-ionic, the amounts of said dispersing phase and of said surfactant being such as to obtain an oil-in-water nanoemulsion having a HLB higher than that of said mixture (1).

In accordance with a preferred embodiment of the present invention, said oil-in-water nanoemulsion can have a HLB value higher than or equal to 9, preferably ranging from 10 to 16.

In accordance with a preferred embodiment of the present invention, in said oil-in-water nanoemulsion, the dispersed phase (i.e. oil) can be distributed in the dispersing phase (i.e. water and surfactants) in the form of droplets having a specific area (area/volume) ranging from 6,000 $m^2/lt$ to 300,000 $m^2/lt$, preferably ranging from 15,000 $m^2/lt$ to 200,000 $m^2/lt$.

In accordance with a preferred embodiment of the present invention, said oil-in-water nanoemulsion can comprise an amount of surfactants ranging from 0.1% by weight to 20% by weight, preferably ranging from 0.25% by weight to 12% by weight and an oil amount ranging from 2% by weight to 20% by weight, preferably ranging from 3% to 15% by weight with respect to the total weight of said oil-in-water nanoemulsion.

In accordance with a preferred embodiment of the present invention, said surfactants can be selected from: non-ionic surfactants, such as, for example, alkyl polyglucosides; fatty acid esters of sorbitan; polymeric surfactants such as, for example, grafted acrylic copolymers having a backbone of polymethyl methacrylate-methacrylic acid and side-chains of polyethylene glycol; or mixtures thereof.

In accordance with a preferred embodiment of the present invention, said oil can be selected from: aromatic hydrocarbons such as, for example, xylene, mixtures of isomers of xylene, toluene, benzene, or mixtures thereof; linear, cyclic or branched, hydrocarbons such as, for example, hexane, heptane, decane, dodecane, cyclohexane, or mixtures thereof; complex mixtures of hydrocarbons such as, for example, diesel fuel, kerosene, soltrol, mineral spirit, or mixtures thereof; or mixtures thereof.

With respect to the water which can be used for the preparation of said nanoemulsions, this can be of any origin. For economical reasons, it is preferable for said water to be available near the preparation site of said oil-in-water nanoemulsion.

In accordance with a preferred embodiment of the present invention, demineralized water, salt water, water containing additives, or mixtures thereof, can be used.

In accordance with a preferred embodiment of the present invention, said oil-in-water nanoemulsion can have a pH ranging from 7 to 13, preferably ranging from 8 to 12.

It should be noted that, if necessary, the pH of said oil-in-water nanoemulsion can be modified by the addition of an acid aqueous solution (e.g., an aqueous solution of hydrochloric acid), or of a base aqueous solution (e.g., an aqueous solution of sodium hydroxide)). It should also be noted that the addition of said acid or base aqueous solution does not alter the performances of said nanoemulsion.

The injection of said oil-in-water nanoemulsion into said oil or gas well, and/or surface structures, and/or equipment connected therewith, and/or hydrocarbon bearing formations, can normally be effected using methods known in the art, for example, by the use of pumps.

In accordance with a preferred embodiment of the present invention, said oil-in-water nanoemulsion can be injected into said oil or gas well, and/or surface structures, and/or equipment connected therewith, and/or hydrocarbon bearing formations, at a temperature ranging from 5° C. to 90° C., preferably ranging from 15° C. to 80° C.

In accordance with a preferred embodiment of the present invention, said oil-in-water nanoemulsion can be left in said oil or gas well, and/or surface structures, and/or equipment connected therewith, and/or hydrocarbon bearing formations, for a time ranging from 1 hour to 10 days, preferably from 8 hours to 2 days.

The amount of oil-in-water nanoemulsion which can be injected depends on various factors, such as, for example, the amount and type of deposits to be removed, the location of said deposits, (i.e. the distance of said deposits from the injection point), the oil content of the nanoemulsion used. An amount by volume of nanoemulsion which can be injected generally ranges from 1:1 to 1:1000 (vol:vol) preferably ranges from 1:20 to 1:500 (vol:vol) with respect to the total volume of the deposits to be removed.

The injection of said oil-in-water nanoemulsion into said oil or gas well, and/or surface structures, and/or equipment connected therewith, and/or hydrocarbon bearing formations, can be effected in a single step or in several steps, preferably in a single step.

After the injection, said nanoemulsion can be optionally circulated inside said oil or gas well, and/or surface structures, and/or equipment connected therewith, and/or hydrocarbon bearing formations, by means of methods known in the art, for example using pumps.

It should be noted that the injection of said oil-in-water nanoemulsion into said oil or gas well, and/or surface structures, and/or equipment connected therewith, and/or hydrocarbon bearing formations, envisages a stoppage period in the production of oil or gas. Said stoppage period corresponds to the time during which said oil-in-water nanoemulsion is left in contact with said deposits.

At the end of this stoppage period, a so-called blowdown operation can be effected by supplying at high flow-rates in order to eliminate fluids extraneous to those of the hydrocarbon bearing formations.

At the end of the blowdown, the oil component of said nanoemulsion can be found as solvent of said deposits in said oil or gas well, and/or surface structures, and/or equipment connected therewith, and/or hydrocarbon bearing formations; or, if the deposit is a clogging emulsion, the oil component of said nanoemulsion can be found in the oil phase of said clogging emulsion. The aqueous phase of said nanoemulsion comprising surfactants can, on the other hand, be recovered and disposed of.

In order to remove said deposits and keep said oil or gas well, and/or surface structures, and/or equipment connected therewith, and/or hydrocarbon bearing formations, clean, it is possible to schedule the injection of said oil-in-water nanoemulsion in predetermined times (once a month, for example, or once every six months). Said times depend on the characteristics of said deposits.

BRIEF DESCRIPTION OF DRAWINGS

FIG. 1 (Samples B) shows the above samples—maintained for 24 hours (time=24 hours) at room temperature (25° C.) under static consitions—containing asphaltene and oil-in-water nanoemulsion with increasing concentrations of xylene (from left to right) as described in Example 2.

FIG. 2 (Samples B) shows the above samples ater 24 hours, at room temperature (25° C.) subjected to hand vibration and left to settle for 1 hour at room temperature (25° C.), containing clogging emulsion and oil-in-water nanoemulsion with increasing concentrations of xylene (from left to right) as described in Example 3.

Figure 1:
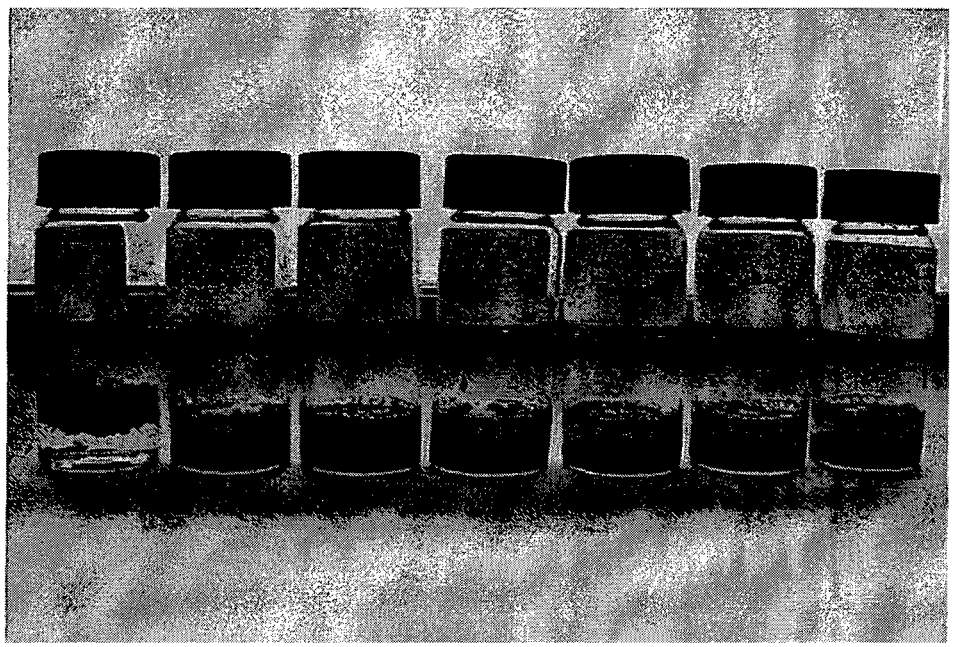
FIG. 1 (Samples A) shows samples at the starting moment (time=0) containing asphaltene and oil-in-water nanoemulsion with increasing concentrations of xylene (from left to right) as described in Example 2.
Figure 1:
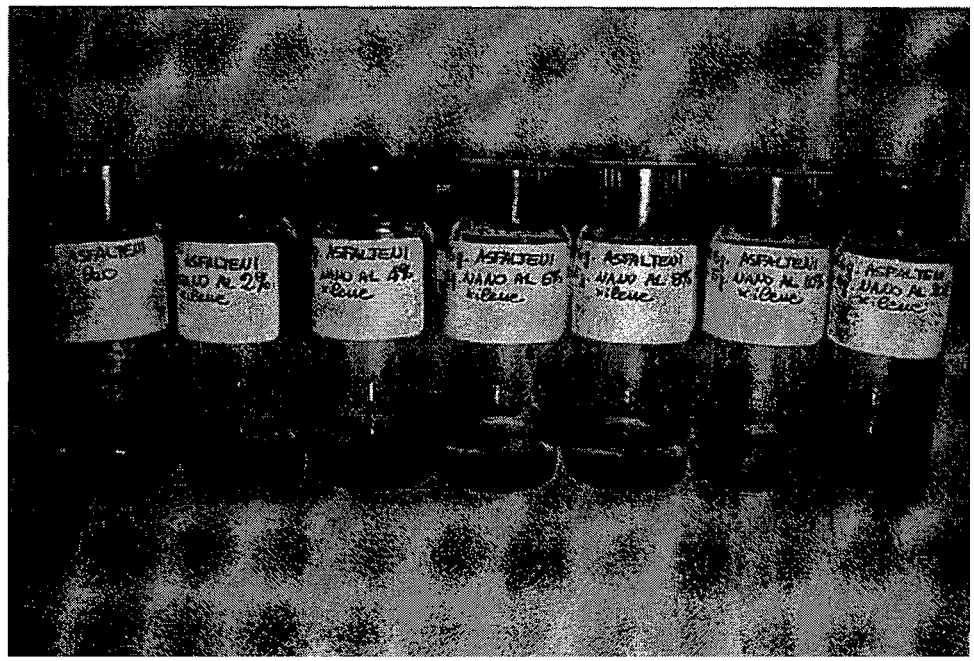

Some illustrative and non-limiting examples are provided for a better understanding of the present invention and for its embodiment.

EXAMPLE 1

(1) Preparation of the Precursor of the Oil-in-Water Nanoemulsion 0.121 g of Atlox 4913 (polymethylmethacrylate-polyethyleneglycol graft copolymer of Uniqema), 0.769 g of Span 80 (sorbitan monooleate of Fluka), 3.620 g of Glucopone 600 CS UP (alkyl polyglucoside of Fluka, 50% solution in water) and 6.150 g of xylene, were poured into a 50 ml beaker equipped with a magnetic stirrer, and the whole mixture was kept under stirring until complete dissolution. When the dissolution was complete, 4.340 g of deionized water were added and the whole mixture was kept under bland stirring for 2 hours, obtaining 15 g of a precursor having a HLB equal to 12.80.

Said precursor was left to stabilize for 24 hours at room temperature (25° C.), before being used.

(2) Preparation of the Oil-in-Water Nanoemulsion 0.325 g of Glucopone 215 CS UP (alkyl polyglucoside of Fluka, 60% solution in water) and 2.236 g of deionized water, were poured into a 20 ml glass vial, and the whole mixture was maintained under stirring until complete dissolution.

When the dissolution was complete, 2.439 g of precursor obtained as described above, were added and the whole mixture was kept under bland stirring, for 2 hours, obtaining a nanoemulsion having a transparent-translucid appearance, a HLB equal to 13.80 and a xylene concentration equal to 20% by weight with respect to the total weight of the nanoemulsion.

Said nanoemulsion was used for obtaining, through dilution with deionized water, nanoemulsions at different concentrations (% by weight) of xylene indicated in Table 1.

TABLE 1

| Oil-in-water nanoemulsion | Total surfactants (% weight)* | Water (% weight)* | Xylene (% weight)* |
| --- | --- | --- | --- |
| (a) | 1.2 | 96.8 | 2 |
| (b) | 2.4 | 93.6 | 4 |
| (c) | 3.6 | 90.4 | 6 |
| (d) | 4.8 | 87.2 | 8 |
| (e) | 6.0 | 84.0 | 10 |
| (f) | 12 | 68.0 | 20 |

*= % weight with respect to the total weight of the nanoemulsion.

The nanoemulsions obtained as described above, have droplets of dispersed phase (xylene) having dimensions ranging from 40 nm to 60 nm, a polydispersity index lower than 0.2 and are stable for over six months.

EXAMPLE 2

The following samples were prepared in order to evaluate the removal capacity of asphaltene deposits of the nanoemulsion in accordance with the present invention.

Samples of 0.6 g of asphaltene were crushed manually in a mortar and sieved by means of a 4 mm-mesh aluminium sieve. The samples thus prepared were treated using nanoemulsions at different concentrations of xylene, obtained as described above and indicated in Table 1.

For the above purpose, 5 g of the oil-in-water nanoemulsion to be tested and whose characteristics are indicated in Table 2, were added to each sample. A sample was prepared, for comparative purposes, to which 5 g of deionized water were added (sample 1 of Table 2).

TABLE 2

| SAMPLE | Xylene conc. in oil-in-water nanoemulsion (% weight)[1] | Amount of xylene with respect to asphaltene (% weight)[2] | nanoemulsion pH |
| --- | --- | --- | --- |
| 1 (comparative) | 0 | 0 | 7.53[3] |
| 2 | 2 | 16.6 | 7.45 |
| 3 | 4 | 33.3 | 8.53 |
| 4 | 6 | 50.0 | 8.74 |
| 5 | 8 | 66.6 | 9.02 |
| 6 | 10 | 83.3 | 9.24 |
| 7 | 20 | 166.6 | 9.66 |

[1]= % weight with respect to the total weight of the nanoemulsion;
[2]= % weight with respect to the total weight of the asphaltene contained in the sample;
[3]= pH of the deionized water as such.

FIG. 1 (Samples A) shows samples at the starting moment (time=0) containing asphaltene and oil-in-water nanoemulsion with increasing concentrations of xylene (from left to right). It can be seen that the oil-in-water nanoemulsions are capable, even at low concentrations of xylene (i.e. 4%), to come into contact with the asphaltene and to start the formation of a black fluid phase on the surface, whereas, in case of the use of water alone, the asphaltene begins to form an agglomerate on the surface.

FIG. 1 (Samples B) shows the above samples—maintained for 24 hours (time=24 hours) at room temperature (25° C.) under static conditions—containing asphaltene and oil-in-water nanoemulsion with increasing concentrations of xylene (from left to right). It can be seen that the use of the oil-in-water nanoemulsion allows, even at low concentrations of xylene (i.e. 4%), a good removal of the asphaltene which is solubilized, forming a black fluid phase on the surface whereas, in case of the use of water alone, the asphaltene forms an agglomerate on the surface.

EXAMPLE 3

The following samples were prepared in order to evaluate the removal capacity of clogging emulsions of the nanoemulsion in accordance with the present invention.

Samples of 1 g of clogging emulsion comprising 80% of formation water and 20% of gasoline rich in highly unstable asphaltenes, coming from the oil field of Pineto (Teramo), were treated using nanoemulsions at different concentrations of xylene, obtained as described above and indicated in Table 1.

For the above purpose, 5 g of the oil-in-water nanoemulsion to be tested, whose characteristics are indicated in Table 3, were added to each sample. For comparative purposes, a sample was prepared to which 5 g of deionized water were added (sample 1 of Table 3)

TABLE 3

| SAMPLE | Xylene conc. in oil-in-water nanoemulsion (% weight)[1] | Amount of xylene with respect to clogging emulsion (% weight)[2] | nanoemulsion pH |
| --- | --- | --- | --- |
| 1 (comparative) | 0 | 0 | 7.53[3] |
| 2 | 2 | 10 | 7.45 |
| 3 | 4 | 20 | 8.53 |
| 4 | 6 | 30 | 8.74 |
| 5 | 8 | 40 | 9.02 |
| 6 | 10 | 50 | 9.24 |
| 7 | 20 | 100 | 9.66 |

[1]= % weight with respect to the total weight of the nanoemulsion;
[2]= % weight with respect to the total weight of the clogging emulsion contained in the sample;
[3]= pH of deionized water as such.

Figure 2:
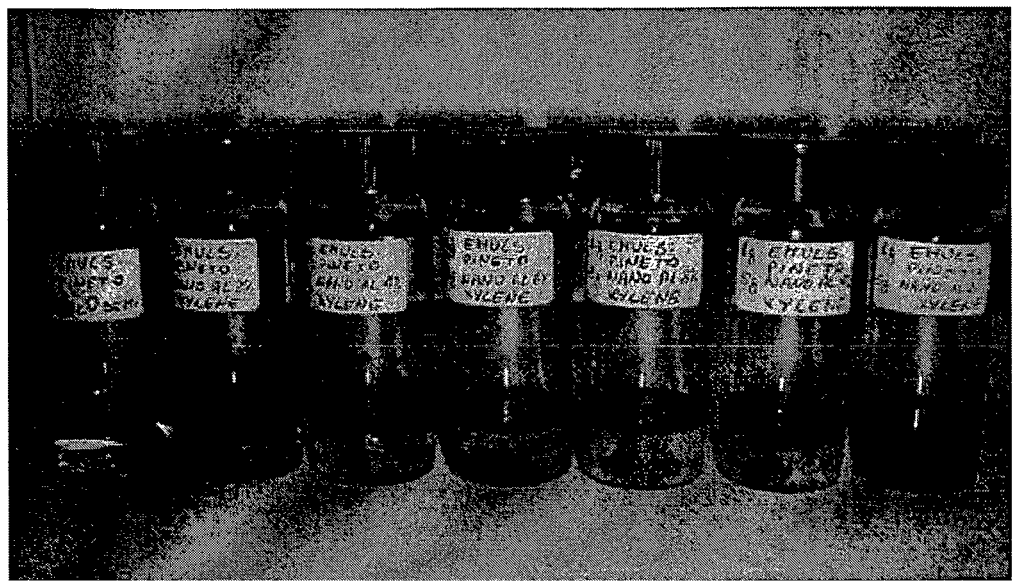
FIG. 2 (Samples A) shows the samples, after 24 hours, at room temperature (25° C.) and under static conditions, containing clogging emulsion and oil-in-water nanoemulsion with increasing concentrations of xylene (left to right) as described in Example 3.
Figure 2:
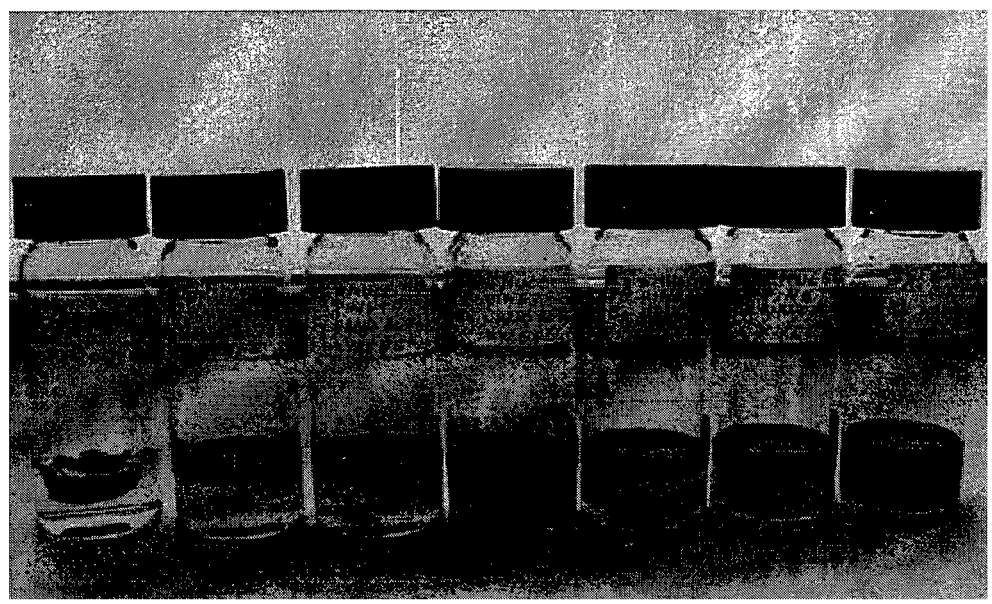

FIG. 2 (Samples A) shows the samples, after 24 hours, at room temperature (25° C.) and under static conditions, containing clogging emulsion and oil-in-water nanoemulsion with increasing concentrations of xylene (left to right). It can be seen that the use of the oil-in-water nanoemulsion allows, even at low concentrations of xylene (i.e.4%), a good removal of the clogging emulsion which is solubilized forming a black fluid phase on the surface whereas, in the case of the use of water alone, the asphaltene forms an agglomerate on the surface.

FIG. 2 (Samples B) shows the above samples after 24 hours, at room temperature (25° C.) subjected to hand vibration and left to settle for 1 hour at room temperature (25° C.), containing clogging emulsion and oil-in-water nanoemulsion with increasing concentrations of xylene (from left to right). It can be seen that the use of the oil-in-water nanoemulsion allows, even at low concentrations of xylene (i.e.4%), a good removal of the clogging emulsion which is solubilized forming a black fluid phase on the surface whereas, in the case of use of water alone, the asphaltene agglomerate remains on the surface.

EXAMPLE 4

The following samples were prepared in order to evaluate the removal capacity of asphaltene deposits of the nanoemulsion in accordance with the present invention, with respect to the use of solvent.

Samples of 0.6 g of asphaltene were manually crushed in a mortar and sieved by means of a 4 mm-mesh aluminium sieve.

The samples thus prepared were treated by adding:
(a) 5 g of the nanoemulsion at 10% of xylene obtained as described in Example 1;
(b) 0.5 g of xylene and 4.5 g of deionized water, in succession;
(c) 4.5 g. of deionized water and 0.5 g of xylene, in succession.

Figure 3:
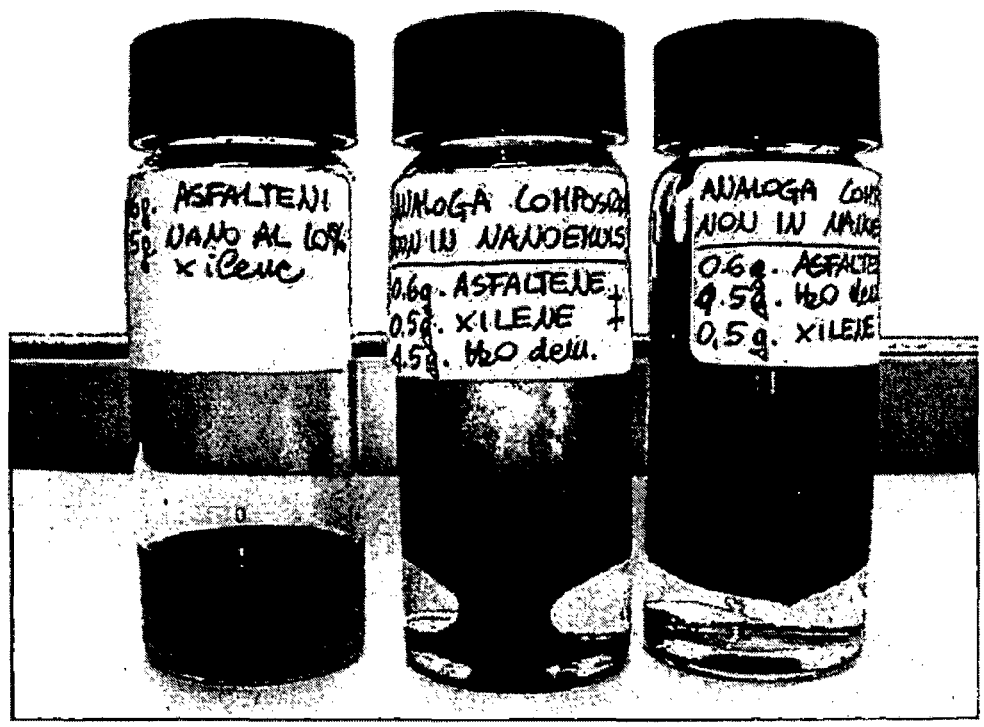
FIG. 3 shows the above samples (a), (b) and (c) (from left to right) maintained for 24 hours, at room temperature (25°C.), under static conditions. It can be seen that the use of the oil-in-water nanoemulsion allows a good removal of the asphaltene which is solubilized forming a black fluid phase on the surface as described in Example 4.

FIG. 3 shows the above samples (a), (b) and (c) (from left to right) maintained for 24 hours, at room temperature (25° C.), under static conditions. It can be seen that the use of the oil-in-water nanoemulsion allows a good removal of the asphaltene which is solubilized forming a black fluid phase on the surface.

If xylene and water are added, in succession, a lower effect is observed: the walls are in fact dirty and the asphaltene does not form a well-separable black fluid phase on the surface.

If water and xylene are added, in succession, a very low effect is observed: the asphaltene, in fact, remains in the form of a very viscous fluid.

The invention claimed is:

1. A process for removing deposits, the process comprising:
injecting at least one oil-in-water nanoemulsion into at least one space selected from the group consisting of an oil well, a gas well, a surface structure, and a hydrocarbon bearing formation; and
leaving the at least one nanoemulsion in the space for from 1 hour to 10 days,
wherein said oil-in-water nanoemulsion has a dispersed phase consisting essentially of an oil and a dispersing phase consisting essentially of water and at least one surfactant, and
wherein said oil-in-water nanoemulsion is prepared according to a process comprising diluting a homogeneous water/oil mixture (1) in a dispersing phase consisting of water to which at least one surfactant (2) has been added,
wherein:
the homogeneous water/oil mixture (1) comprises water, in an amount ranging from 65% by weight to 99.9% by weight with respect to a total weight of the mixture (1), and at least two surfactants (1) having a different hydrophilic-lipophilic balance from one another, in amounts such that the mixture (1) is homogenous;
an interface tension of the homogeneous water/oil mixture (1) is lower than or equal to 1 mN/m;
the surfactants (1) and (2) are selected from the group consisting of a non-ionic surfactant, an anionic surfactant and a polymeric surfactant; and
amounts of said dispersing phase and of said surfactant (2) are such that the oil-in-water nanoemulsion has a hydrophilic-lipophilic balance higher than that of the homogeneous water/oil mixture (1).

2. The process of claim 1, wherein said process is suitable for removing organic deposits.

3. The process of claim 1, wherein said oil-in-water nanoemulsion has a dispersed phase consisting of an oil and a dispersing phase consisting of water and at least one surfactant.

4. The process of claim 3, the dispersed phase is distributed in the dispersing phase in the form of droplets having a diameter ranging from 10 nm to 500 nm.

5. The process of claim 4, wherein the dispersed phase is distributed in the dispersing phase in the form of droplets having a diameter ranging from 15 nm to 200 mn.

6. The process of claim 1, wherein said oil-in-water nanoemulsion has a hydrophilic-lipophilic balance value higher than or equal to 9.

7. The process of claim 6, wherein said oil-in-water nanoemulsion has a hydrophilic-lipophilic balance value ranging from 10 to 16.

8. The process of claim 1, wherein, in said oil-in-water nanoemulsion, the dispersed phase is distributed in the dispersing phase in the form of droplets having a specific area (area/volume) ranging from 6000 $m^2/l$ to 300000 $m^2/l$.

9. The process of claim 8, wherein, in said oil-in-water nanoemulsion, the dispersed phase is distributed in the dispersing phase in the form of droplets having a specific area (area/volume) ranging from 15000 $m^2/l$ to 200000 $m^2/l$.

10. The process of claim 1, wherein surfactants are present in said oil-in-water nanoemulsion in an amount ranaing from 0.1% by weight to 20% by weight with respect to a total weight of said oil-in-water nanomulsion.

11. The process of claim 10, wherein surfactants are present in said oil-in-water nanoemulsion in an amount ranging from 0.25% by weight to 12% by weight with respect to the total weight of said oil-in-water nanoemulsion.

12. The process of claim 1, wherein said oil is present in said oil-in-water nanoemulsion in an amount ranging from 2% by weight to 20% by weight with respect to a total weight of said oil-in-water nanoemulsion.

13. The process of claim 12, wherein said oil is present in said oil-in-water nanoemulsion in an amount ranging from 3% by weight to 15% by weight with respect to a total weight of said oil-in-water nanoemulsion.

14. The process of claim 3, wherein a surfactant selected from the group consisting of a non-ionic surfactant, an ester of a fatty acid of sorbitan, a polymeric surfactant, and mixtures thereof is present in said dispersing phase.

15. The process of claim 3, wherein said oil is selected from the group consisting of an aromatic hydrocarbon, a linear hydrocarbon, a branched hydrocarbon, a cyclic hydrocarbon, and mixtures thereof.

16. The process of claim 3, wherein said water is selected from the group consisting of a demineralized water, salt water, and a mixture thereof.

17. The process of claim 1, wherein said oil-in-water nanoemulsion has a pH ranging from 7 to 13.

18. The process of f claim 17, wherein said oil-in-water nanoemulsion has a pH ranging from 8 to 12.

19. The process of claim 1, wherein said oil-in-water nanoemulsion is injected into the space at a temperature ranging from 5° C. to 90° C.

20. The process of claim 19, wherein said oil-in-water nanoemulsion is injected into the space at a temperature ranging from 15° C. to 80° C.

21. The process of claim 19, wherein said oil-in-water nanoemulsion is left in the space for a time ranging from 8 hours to 2 days.

* * * * *